United States Patent
Siraj et al.

(10) Patent No.: US 11,245,446 B2
(45) Date of Patent: *Feb. 8, 2022

(54) DECODING MU-MIMO AND OFDMA TRANSMISSIONS FOR WIDS AND PACKET CAPTURE IN WLANS

(71) Applicant: Hewlett Packard Enterprise Development LP, Houston, TX (US)

(72) Inventors: Shahnawaz Siraj, San Jose, CA (US); Eldad Perahia, Park City, UT (US); Sachin N. Ganu, San Jose, CA (US); Liang Li, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,269

(22) Filed: Aug. 5, 2020

(65) Prior Publication Data

US 2020/0366343 A1 Nov. 19, 2020

Related U.S. Application Data

(63) Continuation of application No. 16/258,496, filed on Jan. 25, 2019, now Pat. No. 10,742,276.

(51) Int. Cl.
*H04L 1/00* (2006.01)
*H04B 7/0452* (2017.01)
(Continued)

(52) U.S. Cl.
CPC ......... *H04B 7/0452* (2013.01); *H04L 1/0003* (2013.01); *H04L 43/106* (2013.01);
(Continued)

(58) Field of Classification Search
CPC combination set(s) only.
See application file for complete search history.

(56) References Cited

U.S. PATENT DOCUMENTS 9,560,073 B2  1/2017 Mookiah et al.
9,686,002 B1  6/2017 Schelstraete et al.
(Continued)

OTHER PUBLICATIONS

802.11ac: The Fifth Generation of Wi-Fi, (Technical White Paper), Retrieved Oct. 23, 2018, 20 Pgs.
(Continued)

*Primary Examiner* — Jung Liu
(74) *Attorney, Agent, or Firm* — McDermott Will & Emery (57) ABSTRACT

A method including selecting multiple dedicated radios on a transmission channel and programming multiple association identifiers on each dedicated radio is provided. Each of the association identifiers is configured to detect a resource unit assigned to one of multiple stations. The method includes providing multiple packets collected from the dedicated radios to a server and merging the packets from the dedicated radios to identify at least one station. Merging the packets includes identifying a preamble in the packets from the dedicated radios, matching the preamble from different dedicated radios, combining a data portion of the packets from different dedicated radios whose preamble match, selecting a time-stamp from one of the dedicated radios, and associating the time-stamp with the data portion. A system and a non-transitory, computer readable medium storing instructions to perform the above method are also provided.

17 Claims, 7 Drawing Sheets

(51) Int. Cl.
　　　*H04W 24/08*　　　(2009.01)
　　　*H04L 12/26*　　　(2006.01)
　　　*H04L 5/00*　　　　(2006.01)
　　　*H04W 84/12*　　　(2009.01)

(52) U.S. Cl.
　　　CPC .......... *H04W 24/08* (2013.01); *H04L 5/0007* (2013.01); *H04W 84/12* (2013.01)

(56) References Cited

U.S. PATENT DOCUMENTS

| | | | |
|---|---|---|---|
| 2015/0103767 A1* | 4/2015 | Kim | H04W 74/06 |
| | | | 370/329 |
| 2016/0050052 A1 | 2/2016 | Suh et al. | |
| 2016/0157127 A1 | 6/2016 | Zeger et al. | |
| 2017/0150493 A1* | 5/2017 | Seok | H04B 7/0452 |
| 2017/0170937 A1* | 6/2017 | Chun | H04L 5/0094 |
| 2017/0373808 A1* | 12/2017 | Park | H04L 5/005 |
| 2017/0373890 A1* | 12/2017 | Fertonani | H04B 1/1661 |
| 2018/0213549 A1* | 7/2018 | Kim | H04L 1/00 |

OTHER PUBLICATIONS

IEEE 802.11ax: The Sixth Generation of Wi-Fi, (Technical White Paper), Retrieved Oct. 23, 2018, 15 Pgs.

\* cited by examiner

DECODING MU-MIMO AND OFDMA TRANSMISSIONS FOR WIDS AND PACKET CAPTURE IN WLANS

BACKGROUND

Current wireless local area network (WLAN) applications make use of sophisticated multi-user, multiple input-multiple output (MU-MIMO) and orthogonal frequency division multiple access (OFDMA) packet transmission between network devices (e.g., access points) and stations (e.g., mobile client devices) at the network edge. Such protocols provide enhanced efficiency by transmissions to/from multiple stations at the same time, but pose a challenge for a second network device trying to "listen" or "sniff" into a communication channel between a station and a first network device, such as in a WLAN intrusion detection system (WIDS). When the second network device has a legitimate goal of capturing packets for monitoring and diagnostics by a network controller or manager, important security and diagnostics information may be lost or hidden when a MU-MIMO or OFDMA prevents packet capture by the second network device.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

MU-MIMO and OFDMA are two new technologies recently introduced to optimize the operation of WLANs and enhance the efficiency of wireless medium access. In a MU-MIMO, an access point (AP) or any network can transmit packets simultaneously to multiple client stations using different spatial streams. However, MU-MIMO technology poses limitations to a second access point (AP) or network device trying to collect (e.g., "sniff" or "capture") at least one packet in the transmission, using a Wi-Fi radio, for security checks and network diagnostics. In the case of MU-MIMO, the complications arise due to the beam-formed nature of simultaneous transmissions to multiple stations. In MU-MIMO, the beamforming ensures effective cancellation of signal at unintended receivers, which reduces or essentially cancels the possibility of a second network device to sniff or capture sample packets. An OFDMA approach multiplexes users in the same channel bandwidth. OFDMA builds on OFDMA digital modulation schemes, further assigning specific sets of subcarriers, or resource units (RUs) to individual users. In some embodiments, OFDMA divides existing WLAN channels (e.g., 20, 40, 80 and 160 MHz wide) into smaller sub-channels with a predefined number of subcarriers.

Monitoring multi-user transmissions for the purposes of rogue detection in MU-MIMO and OFDMA WLAN configurations poses several challenges. The spatial nulling of the transmitted signal at any unintended receiver in MU-MIMO configurations substantially reduce signal-to-noise ratio (SNR) at the monitoring radio frequency to receive and decode downlink (DL) transmissions at a non-beam-formed receiver (e.g., a sniffer AP). Another challenge to overcome includes hardware limitations to capture and decode OFDMA transmissions at a monitoring sniffer in the vicinity of the AP and its OFDMA clients, in current radio designs. The challenge lies in the ability of radio to tune the RF parameters in real time to be able to decode the data portion of the transmission and also that transmissions to different users are on different RU's.

Embodiments as disclosed herein solve the above technical problem arising in computer network technology by providing a technical solution, namely, using multiple radios to decode DL-OFDMA transmissions from an AP to its clients (e.g., stations) and reconstruct a transmitted frame. In some embodiments, a single monitoring AP may perform the sniffing when there are no multiple co-channel monitoring APs in the vicinity. Accordingly, embodiments as disclosed herein provide enhanced troubleshooting capabilities for WIDS, and a desirable visibility into OFDMA and MU-MIMO transmissions. Further, some embodiments can be used to evaluate different schedulers in WLAN applications. Moreover, embodiments as disclosed herein provide wireless intrusion detection and information about rogue AP and stations for WLAN administrators.

In one embodiment of the present disclosure, a computer-implemented method is described that includes selecting multiple dedicated radios on a transmission channel and programming multiple association identifiers on each dedicated radio, wherein each of the association identifiers is configured to detect a resource unit assigned to one of multiple stations. The computer-implemented method also includes providing multiple packets collected from the dedicated radios to a server, and merging the packets from the dedicated radios to identify at least one station. Merging the packets includes identifying a preamble in the packets from the dedicated radios, matching the preamble from different dedicated radios, and combining a data portion of the packets from different dedicated radios whose preamble match. Merging the packets also includes selecting a time-stamp from one of the dedicated radios and associating the time-stamp with the data portion.

According to one embodiment, a system is described that includes a memory storing instructions and one or more processors configured to execute the instructions to cause the system to select multiple dedicated radios on a transmission channel, and to program multiple association identifiers on each dedicated radio. Each of the association identifiers is configured to detect a resource unit assigned to one of multiple stations. The one or more processors further execute instructions to provide multiple packets collected from the dedicated radios to a server, to program the association identifiers in a hardware register of the dedicated radio, and to merge the packets from the dedicated radios to identify at least one station. To merge the packets, the one or more processors execute instructions to identify a preamble in the packets from the dedicated radios, to match the preamble from different dedicated radios, to combine a data portion of the packets from different dedicated radios whose preamble match, to select a time-stamp from one of the dedicated radios, and to associate the time-stamp with the data portion.

According to one embodiment, a non-transitory, machine-readable medium is described that includes instructions, which when executed by one or more processors, cause a computer to perform a method, the method including selecting multiple dedicated radios on a transmission channel, programming multiple association identifiers on each dedicated radio, wherein each of the association identifiers is configured to detect a resource unit assigned to one of multiple stations, and providing multiple packets collected from the dedicated radios to a server. The method also includes programming the association identifiers in a hardware register of the dedicated radio and merging the packets from the dedicated radios to identify at least one station. In the method, merging the packets includes identifying a preamble in the packets from the dedicated radios, matching the preamble from different dedicated radios, combining a data portion of the packets from different dedicated radios whose preamble match, selecting a time-stamp from one of the dedicated radios. Merging the packets also includes associating the time-stamp with the data portion, wherein each of the dedicated radios has a different clock, and selecting a same clock for the time-stamp over a period of time.

In yet other embodiment, a system is described that includes a means for storing commands and a means for executing the commands causing the system to perform a method that includes selecting multiple dedicated radios on a transmission channel, and programming multiple association identifiers on each dedicated radio. Each of the association identifiers detects a resource unit assigned to one of multiple stations. The method also includes providing multiple packets collected from the dedicated radios to a server and merging the packets from the dedicated radios to identify at least one station. Merging the packets includes identifying a preamble in the packets from the dedicated radios, matching the preamble from different dedicated radios, and combining a data portion of the packets from different dedicated radios whose preamble match. Merging the packets also includes selecting a time-stamp from one of the dedicated radios, and associating the time-stamp with the data portion.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

Figure 1:
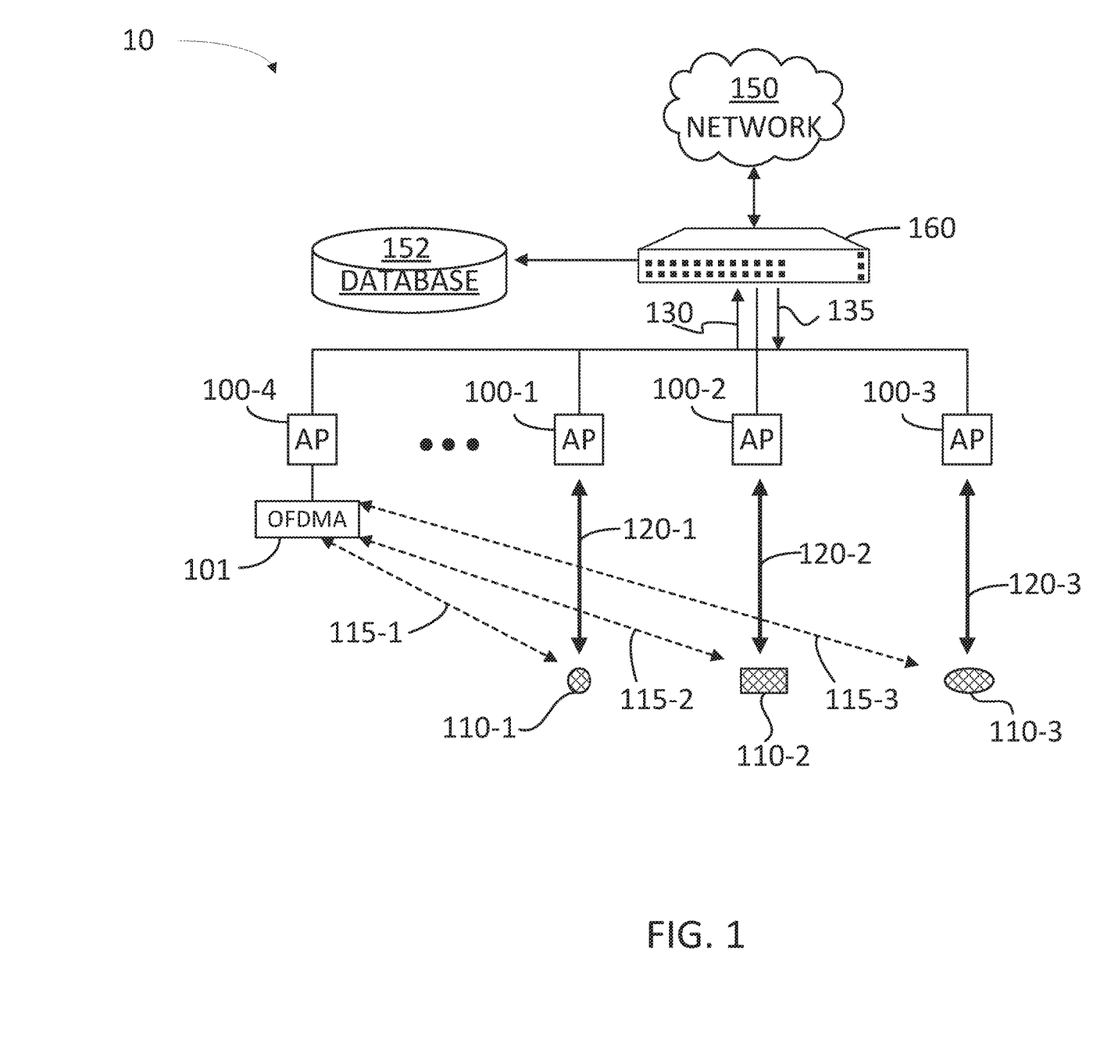
FIG. 1 illustrates a deployment of a wireless local area network including multiple access points for roaming stations, according to one or more embodiments.

FIG. 1 illustrates a deployment of a wireless local area network (WLAN) 10 including multiple access points for roaming stations, according to one or more embodiments. WLAN 10 includes a controller 160 that is communicatively coupled with a network 150 (e.g., a backbone connection to a remote, central server and multiple other networks). Controller 160 manages and distributes network traffic to each of multiple access points (APs) 100-1, 100-2, 100-3 and 100-4 (hereinafter, collectively referred to as "access points 100") via a downlink (DL) 135. Controller 160 may also have access to a database 152 to store network data such as identification and configuration data for APs 100 and for stations 110. More generally, access points 100 may be any type of network device (e.g., routers, multi-purpose modems, network hubs, and the like). Each of APs 100 is configured to communicate with, and provide network services to, stations 110-1, 110-2, and 110-3 (hereinafter, collectively referred to as "stations 110"). In some embodiments, stations 110 are mobile devices and APs 100 include wireless appliances and protocols (e.g., Wi-Fi, BlueTooth, and the like). APs 100 are also configured to provide data (e.g., packets) to controller 160 via an uplink (UL) 130.

In one configuration, AP 100-4 is communicatively coupled with stations 110 through transmission channels 115-1, 115-2, and 115-3 (hereinafter, collectively referred to as "transmission channels 115"), respectively. Transmission channels 115 encode packets to stations 110 via an OFDMA protocol 101. OFDMA protocol 101 enables identification of each of stations 110 vis-à-vis AP 100-4, as well as a targeted reception of each of stations 110 of the corresponding packets provided by AP 100-4. In that regard, transmission channels 115 may be associated with one or more radios in AP 100.

In some configurations, APs 100-1, 100-2, and 100-3 may capture one or more packets associated with each of stations 110, respectively. Accordingly, APs 100-1, 100-2 and 100-3 may set up listening channels 120-1, 120-2, and 120-3 (hereinafter, collectively referred to as "listening channels 120"), respectively. In some embodiments, WLAN 10 includes a WIDS that uses APs 100-1, 100-2 and/or 100-3 in a promiscuous mode for monitoring the contents of wireless frames in transmission channels 115 to detect whether AP 100-4 or any one of stations 110 is a rogue device.

Accordingly, APs 100-1, 100-2 and/or 100-3 intercept WLAN traffic on a particular transmission channel 115 using listening channels 120. For example, listening channel 120-1 may capture packets in transmission channel 115-1. Likewise, listening channel 120-2 may capture packets in transmission channel 115-2. And listening channel 120-3 may capture packets in transmission channel 115-3. Wireless packet captures through listening channels 120 are used in troubleshooting a Wi-Fi issue. In some embodiments, the captured packets are transmitted to controller 160 for processing, and stored in database 152 for future analysis or statistics review.

Accordingly, APs 100-1, 100-2, and 100-3 may include WLAN radio resources programmed in promiscuous mode on a particular transmission channel 115, to parse/decode the entire WLAN frame for MU-MIMO transmit beam-formed transmissions. For OFDMA transmissions, some hardware vendors provide the flexibility to capture OFDMA data for any pre-programmed association ID (AID) between APs 100 and each of stations 110. In some embodiments, the AID can be changed dynamically by programming a register in APs 100. This capability is built into the hardware to tune a radio in any of APs 100 to an RU specific to an AID. The radio gets the frequency and size of the RU from the preamble portion of the frame (e.g., packet) and tunes itself to the matching RU for the pre-programmed AID. For example, when AP 100-4 sends OFDMA data to stations 110 (AIDs—1, 2, and 3), APs 100-1, 100-2 and 100-3 may decode the data sent to any one of stations 110 by programming the corresponding AID value in the hardware register.

Embodiments as disclosed herein lock APs 100-1, 100-2 and 100-3 on the same transmission channel 115. Further, each of APs 100-1, 100-2, and 100-3 is programmed to sniff the assigned resource unit (RU) on each station 110-1, 110-2, and 110-3, respectively. Further, APs 100-1, 100-2, and 100-3 may stream it to controller 160 or to a server (via uplink network 150). The instructions for programming the AIDs on each of APs 100-1, 100-2 and 100-3 can come from a central entity (e.g., controller 160).

Some embodiments include a scheme with a single sniffer AP (e.g., a single radio in any one of APs 100-1, 100-2, or 100-3). In this mode, physical limitations may prevent to fully decode the MAC address and payload of a frame. Accordingly, a WLAN radio in the sniffer AP is programmed in promiscuous mode on a particular transmission channel 115. Such configuration may parse/decode the entire WLAN frame for non-MU-MIMO transmit beam-formed transmissions. For OFDMA transmissions, a single sniffer AP may parse/decode at least preamble information on the packets. Accordingly, to decode DL-OFDMA transmission from preamble the sniffer AP decodes the rate and bandwidth used in each RU. Preamble information may be transmitted using legacy data rates in the entire operating bandwidth. The sniffer AP is able to receive the preamble, which may be the same for the PPDUs captured by each of APs 100. The sniffer AP transmits the preamble to controller 160. Controller 160 then combines the data portion of the PPDUs from APs 100 by matching the preamble. Controller 160 picks a time stamp from one of sniffer APs 100-1, 100-2 and 100-3 (e.g., each monitor may have a different clock).

Figure 2:
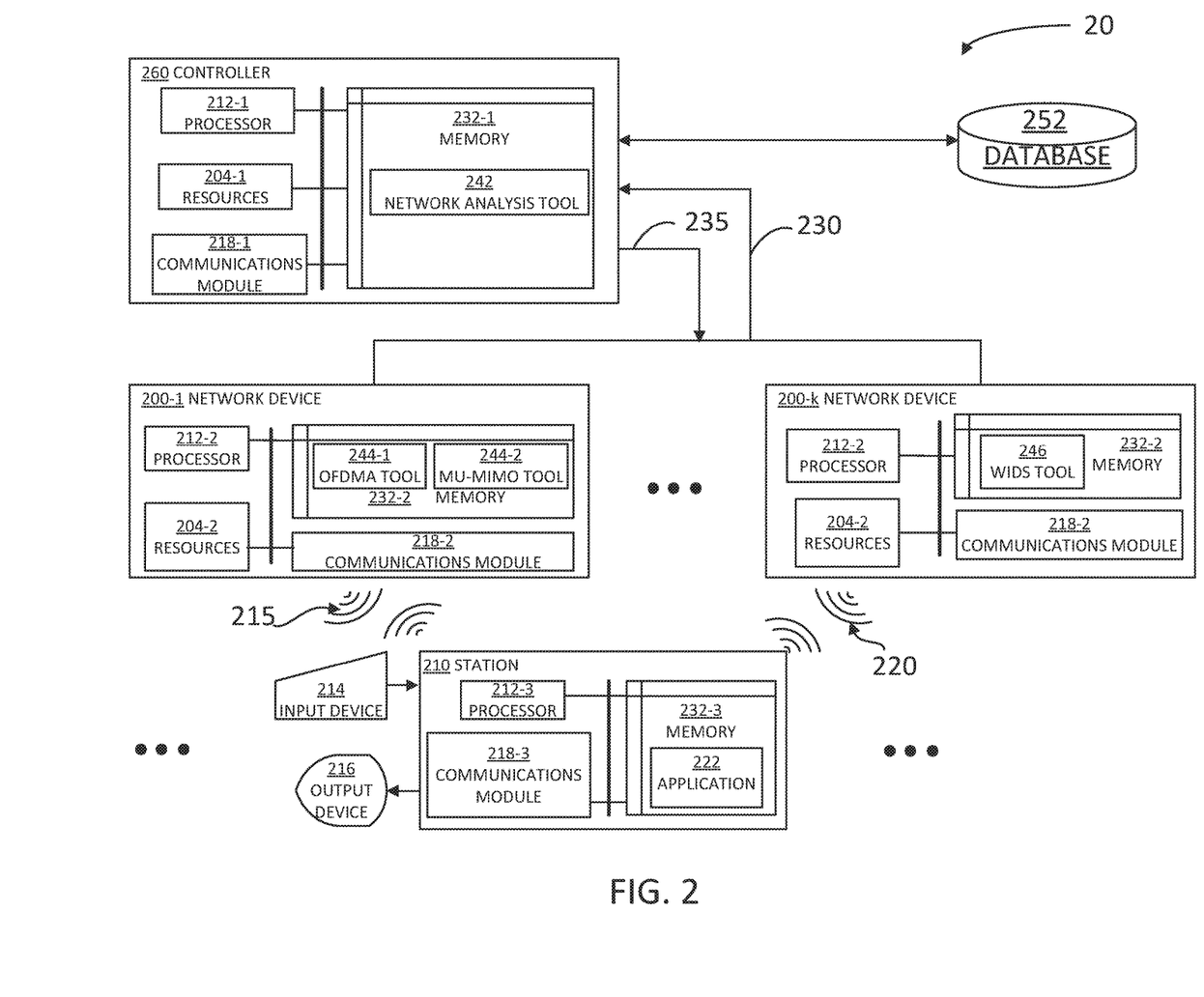
FIG. 2 is a detailed view of some of the hardware components in the network of FIG. 1, according to some embodiments.

FIG. 2 is a detailed view of some of the hardware components in a WLAN 20, according to some embodiments. WLAN 20 includes a controller 260 (cf. controller 160), network devices 200-1 through 200-$k$ (hereinafter, collectively referred to as "network devices 200," wherein 'k' is any integer greater than 1). Controller 260 communicates with network devices 200 via UL 230 and DL 235 (cf. UL 130 and DL 135). WLAN 20 also includes at least one station 210. Station 210 communicates with WLAN 20 through a transmission channel 215 with network device 200-1 (cf. transmission channel 115). Further, at least one of network devices 200 (e.g., network device 200-$k$) may act as a sniffer through listening channel 220 (cf. listening channel 120). Station 210 may include a mobile device handled by a user, and including or coupled to an input device 214 and an output device 216. Input device 214 may include a pointer device (e.g., a mouse or a stylus, or a stick), or it may be a touch screen display. Output device 216 may be integrated in the touchscreen display, or may be a separate display. In some embodiments, input device 214 and output device 216 may be integrated in a microphone for a voice-based user interaction environment.

Network devices 200 may include APs and any other devices used in WLAN 20 to communicate with and provide network services to, station 210 (cf. stations 110). Controller 260, network devices 200, and client device 210 may include processors 212-1, 212-2, and 212-3 (hereinafter, collectively referred to as "processors 212"), and memories 232-1, 232-2 and 232-3 (hereinafter, collectively referred to as "memories 232"), and communications modules 218-1, 218-2 and 218-3 (hereinafter, collectively referred to as "communications modules 218"). Memories 232 may store instructions and commands which, when executed by processors 212, cause any one of controller 260, network devices 200, or station 210, to perform at least partially one or more steps in methods as disclosed herein. More specifically, memory 232-1 in controller 260 may include a network analysis tool 242. A memory device 232-2 in at least one of network devices 200 may include an OFDMA tool 244-1, a MU-MIMO tool 244-2 (or both OFDMA and MU-MIMO tools), and also a WIDS tool 246. And a memory device 232-3 in station 210 may include an application 222 installed or hosted by controller 260, or a remote server accessed by controller 260. Communications modules 218 may be configured to interface with an uplink network to send and receive information, such as data packets, requests, responses, and commands to other devices on network 150 or WLAN 20 Communications modules 218 can be, for example, modems or Ethernet cards. In some embodiments, communications modules 218 include any type of wireless communication card, and wireless communication hardware/software, such as radio-frequency antennas, modulators, de-modulators, and controllers.

More specifically, communications modules 218-1 and 218-2 enable controller 260 and network devices 200 to communicate with each other, and with database 152. Communications modules 218-2 and 218-3 enable each of network devices 200 to communicate with each of stations 210. Communication modules 218-2 and 218-3 may include a wireless communication antenna configured to operate at multiple radio frequencies. For example, communications modules 218-2 and 218-3 may include a first radio operating in a 2.4 GHz band, and a second radio operating in the 5 GHz band. In some embodiments, controller 260 and network devices 200 also include resources 204-1 and 204-2 (hereinafter, collectively referred to as "resources 204"), respectively. Resources 204 may include hardware and software configured to handle wireless communications through multiple radios in communications modules 218. For example, resources 204 may include radios and protocols such as Wi-Fi, Bluetooth and the like. Resources 204 may include hardware and software components, such as radio-frequency (RF) antennas and controller circuits to scan WLAN 201 for one or more stations 210 present therein (e.g., using a BLE radio), and the like.

Network analysis tool 242 may be configured to perform data analytics on the packets received from any one of the sniffer devices among network devices 200. In some embodiments, network analysis tool 242 is configured to merge the data from multiple network devices 200 (e.g., AP 100-1, 100-2, and 100-3), or multiple radios within a single network device 200, to decode an OFDMA or a MIMO packet and parse the contents of the packet. OFDMA tool 244-1 may be configured to code at least a portion of a packet payload with an OFDMA code, and MU-MIMO tool 244-2 may be configured to code at least a portion of a packet payload according to a MU-MIMO protocol.

WIDS tool 246 may be configured to identify a preamble in the packets obtained from the dedicated radios and to combine a data portion of the packets from different dedicated radios whose preamble match. In some embodiments, WIDS tool 246 may be further configured to obtain basic service sets (BSS) information from the captured packets (e.g., BSSID, or "color" of APs 100) from the MAC header of the captured packets. WIDS tool 246 may use the BSS color to match it with the color of beacons received on the same channel 220. When there are more than one BSSID matching the BSS color, WIDS tool 246 compares the SNR of the beacon and OFDMA transmission to get actual BSSID of the transmitting AP (eg. AP 100-4). In some embodiments, WIDS tool 246 is also configured to get information from station 210. To achieve this, WIDS tool 246 may read subsequent block acknowledgement request (BAR) and block acknowledgment (BA) frames in addition to the captured frame, and derive the MAC address of station 210.

Figure 3:
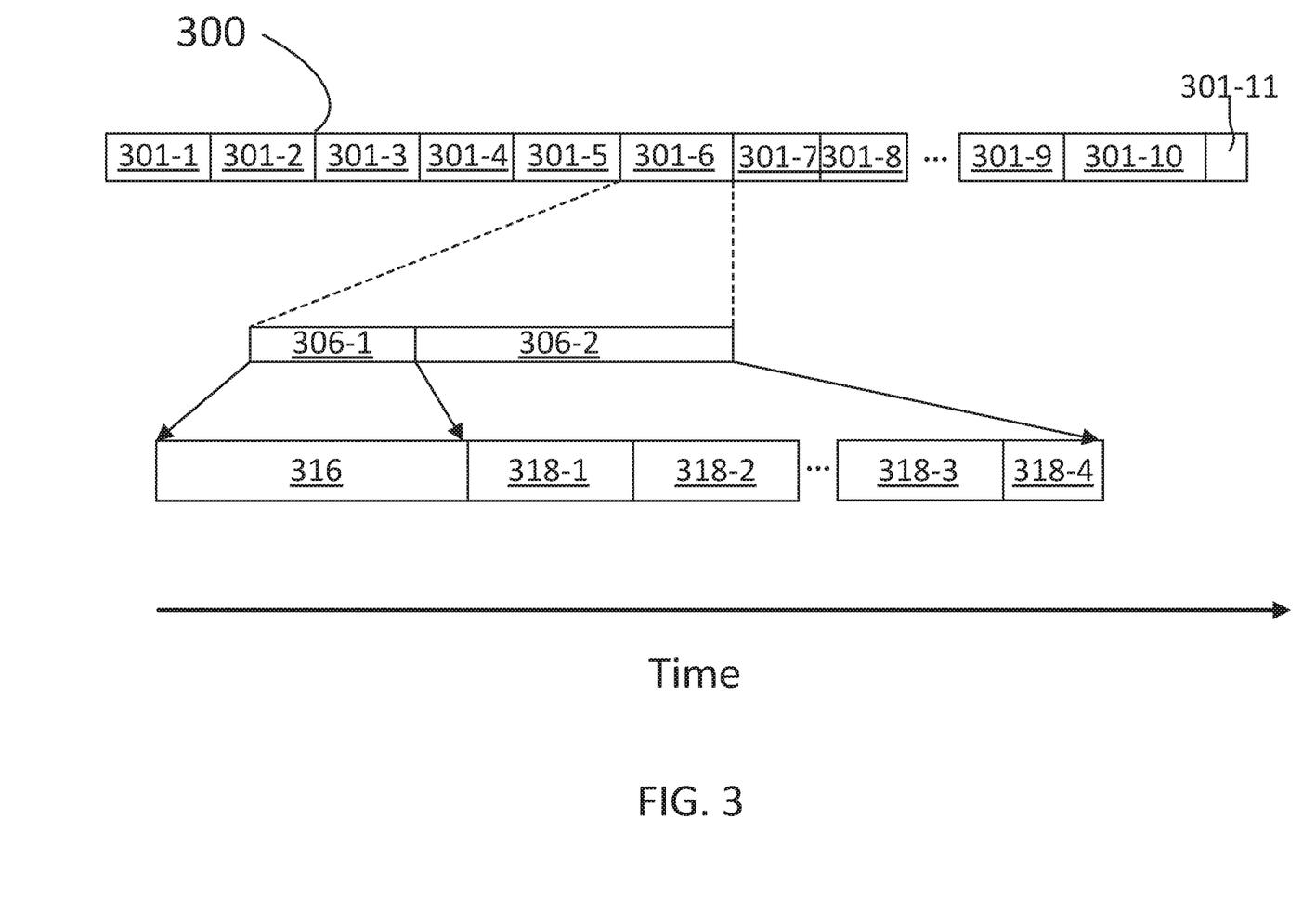
FIG. 3 illustrates a partial schematic view of a data packet in a high-efficiency (HE), multi-user (MU) physical protocol data unit (PPDU) format, according to some embodiments.

FIG. 3 illustrates a partial schematic view of a data packet 300 in a high-efficiency (HE), multi-user (MU) physical protocol data unit (PPDU) format, according to some embodiments. Data packet 300 includes multiple symbols 301-1 (L-STF), 301-2 (L-LTF), 301-3 (L-SIG), 301-4 (RL-SIG), 301-5 (HE-SIG-A), 301-6 (HE-SIG-B), 301-7 (HE-SIT), 301-8 (HE-LTF) through 301-9 (HE-LTF), 301-10 (Data, or payload, which may be encrypted) and 301-11 (packet extension, PE), hereinafter, collectively referred to as "symbols 301." Without limitation, symbols 301 may include an number of symbols, and the choice of 11 symbols 301 is made for illustrative purposes, only. Each of symbols 301 may have a different duration in time. For example, and for illustrative purposes only, in some embodiments symbol 301-1 lasts 4 microseconds (1 microsecond, 1 μs=$10^{-6}$ secs). L-STF, L-LTF, and L-SIG are legacy preambles, duplicated on each 20 MHz band, for backward compatibility with legacy devices. HE-SIG-A is duplicated on each 20 MHz band after the legacy preamble to indicate common control information. HE-SIG-B may be used in DL communication and includes information desirable to interpret packet 300.

In some embodiments, HE-SIG-B 301-6 does not have any OFDMA symbol duplicated in each 20 MHz of the PPDU bandwidth. HE-SIG-B 301-6 may be encoded on a per 20 MHz basis using binary convolutional codes (BCC) with common blocks 306-1 and user blocks 306-2, separated in the bit domain. Common blocks 301-6 may include information 316 for all designated stations to receive the PPDU in the corresponding bandwidth (e.g., common bits+ cyclic redundancy calculation—CRC-+Tail). User blocks 306-2 include multiple sub-fields 318-1 (e.g., 2 users+CRC+ Tail), 318-2 (e.g., 2 users+CRC+Tail), through 318-3 (e.g., 1 or 2 users+CRC+Tail) and 318-4 (e.g., padding); hereinafter, collectively referred to as "user-specific sub-fields 318," that do not belong in the common block. One or more of user-specific sub-fields 318 may be associated with each of the designated stations.

Embodiments as disclosed herein transmit the physical portion of the packet (e.g., fields 301) to upper layers (e.g., to controllers 160 or 260) and compute an RU map, and obtain modulation and coding scheme (MCS) information.

Figure 4:
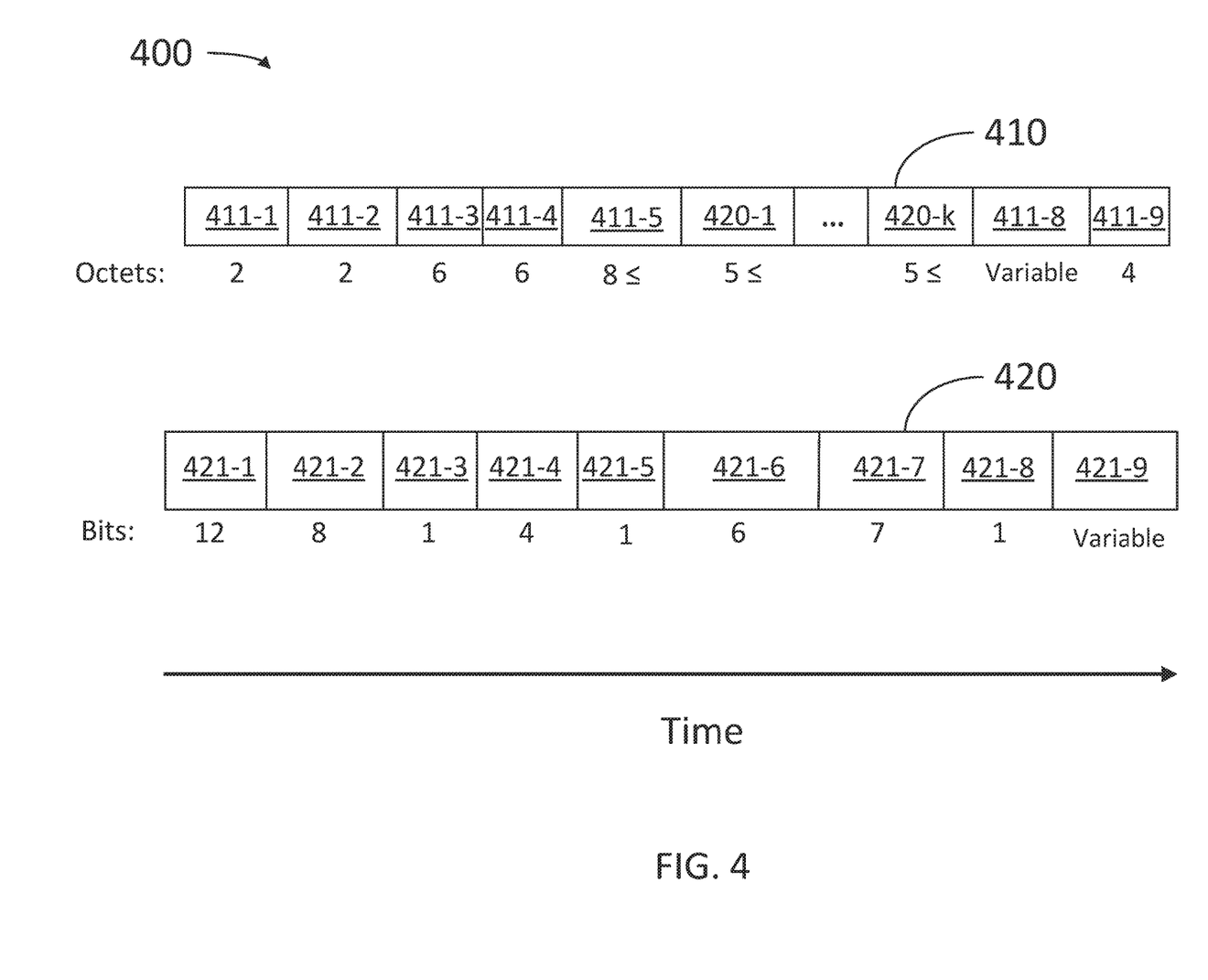
FIG. 4 illustrates a trigger frame and a user info field in a data packet for an uplink (UL) in an orthogonal frequency division multiple access (OFDMA) format, according to some embodiments.

FIG. 4 illustrates a trigger frame 410 and a user info field 420 in a control packet 400 for an uplink (UL) in an orthogonal frequency division multiplexing access (OFDMA) format, or in an UL MU-MIMO format, according to some embodiments. Trigger frame 410 may include fields 411-1 through 411-9 (hereinafter, collectively referred to as "fields 411"). Fields 411 may be measured in terms of their "octet" length (1 octet=8 bits, or 1 byte). In some embodiments, trigger frame 410 includes fields 411-1 (frame control, 2 octets), 411-2 (duration, 2 octets), 411-3 (RA, 6 octets), 411-4 (TA, 6 octets), 411-5 (common info, 8 or more octets), 420-1 through 420-$k$ (user info, wherein k is any integer, hereinafter collectively referred to as "user info field 420," 5 or more octets each), 411-8 (padding, variable length), and 411-9 (frame check sequence -FCS-, 4 octets). User info field 420 may include subfields 421-1 through 421-9 (hereinafter, collectively referred to as "subfields 421"). The length of subfields 421 may be measured in bits, such as: 421-1 (AID12, 12 bits), 421-2 (RU allocation, 8 bits), 421-3 (UL FEC coding type, 1 bit), 421-4 (UL modulation and coding scheme, 4 bits), 421-5 (UL dual subcarrier modulation -DCM-, 1 bit), 421-6 (SS Allocation/ RA-RU information, 6 bits), 421-7 (UL target RSSI, 7 bits), 421-8 (Reserved, 1 bit), 421-9 (trigger dependent user info, variable length).

Trigger frame 410 may be provided by a network device (e.g., AP 100-4) to schedule an uplink MU-MIMO/OFDMA transmission (or UL-MU-MIMO transmission) from multiple stations (e.g., stations 110) at the same time (e.g., simultaneously, or almost simultaneously). A sniffer AP (e.g., any one of APs 100-1, 100-2, and/or 100-3) captures trigger frame 410 and uses information therein to derive the uplink OFDMA transmission (or UL-MU-MIMO transmission) by decoding the UL-MU-MIMO and UL-OFDMA, as follows.

RA field 411-3 is the address of the recipient station(s). When trigger frame 410 has one user info field 420 and subfield 421-1 contains the AID of a station, then RA field 411-3 is set to the address of that STA. When trigger frame 410 is not a GCR MU-BAR, and has either more than one user info field 420 or allocates resources according to RU allocation field 421-2, then RA field 411-3 is set to the broadcast address. In some embodiments, RU allocation field 421-2 includes information about the size of RU. When trigger frame 410 is a GCR MU-BAR then the RA field 411-3 is set to the MAC address of the group for which reception status is being requested.

Subfield 421-1 is used to obtain the MAC address of the user. In some embodiments, the sniffing network device (e.g., APs 100-1, 100-2, and 100-3) maintains AID-MAC address map (e.g., storing it in a database such as database 152). The AID-MAC map can be obtained by querying the network devices or the WLAN controller (e.g., APs 100, network devices 200, and controllers 160 and 260). In some embodiments, the AID-MAC map is obtained from the association frames, when the sniffer device is able to capture them. MCS field 421-4 gives the rate info (e.g., number of bits contained in each of the symbols in data packet 400.

Figure 5:
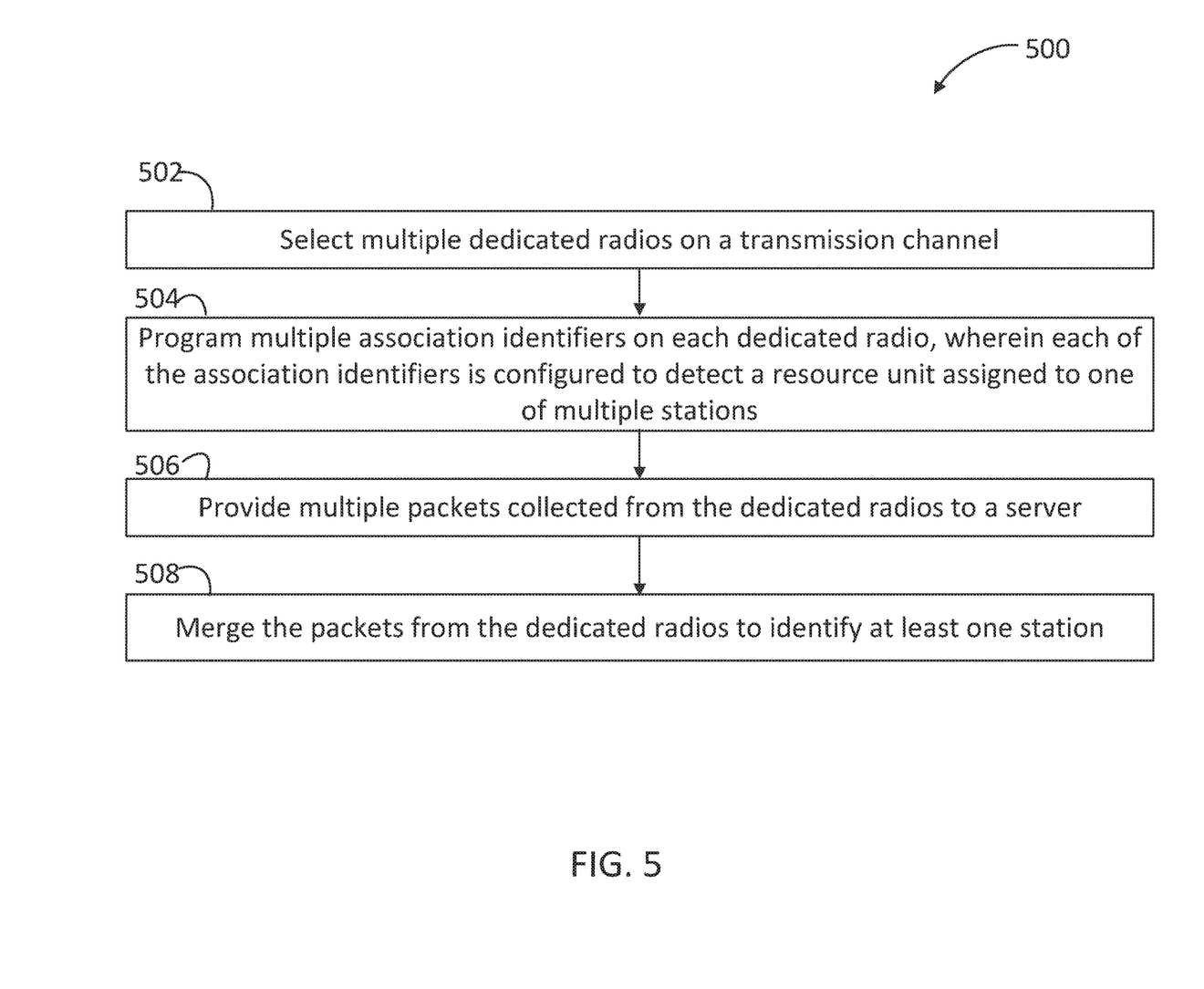
FIG. 5 is a flow chart illustrating steps in a method for decoding packet headers in a wireless-local area network (WLAN) intrusion detection system (WIDS), according to some embodiments.

FIG. 5 is a flow chart illustrating steps in a method 500 for decoding packet headers in a wireless-local area network (WLAN) intrusion detection system (WIDS), according to some embodiments. Method 500 may be performed at least partially by any one of a controller, or a network device while communicating with a station (e.g., any one of controllers 160 and 260, network devices 100 and 200, and stations 110 and 210). The station may be handled by a user, and the user may be a client of a wireless local area network (e.g., network 150, WLANs 10 and 20). The controller may be hosting a network analysis tool (e.g., network analysis tool 242). The network device and the station may host an OFDMA tool and a WIDS tool installed in the network device and an application installed in the station, (e.g., OFDMA tool 244-1, MU-MIMO tool 244-2, WIDS tool 246, and application 222). The controller may access traffic data from the network device, and use the OFDMA tool or the MU-MIMO tool to access the WLAN and identify an unauthorized, unwanted, or malicious intrusion into the WLAN. At least some of the steps in method 500 may be performed by a computer having a processor executing commands stored in a memory of the computer (e.g., any one of processors 212 and memory circuits 220). Further, steps as disclosed in method 500 may include retrieving, editing, and/or storing files in a database that is part of, or is communicably coupled to, the controller (e.g., database 252). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes selecting multiple dedicated radios on a transmission channel. In some embodiments the multiple dedicated radios include multiple baseband decoders in an access point of a wireless network, and step 502 further includes tuning the baseband decoders over multiple tones in a frequency channel to detect the resource unit assigned to one of multiple stations. In some embodiments, step 502 includes selecting a subset of dedicated radios from a set of radios in the radio vicinity of the transmission best suited for packet reception and collection based on neighborhood information.

Step 504 includes programming multiple association identifiers on each dedicated radio, wherein each of the association identifiers is configured to detect a resource unit assigned to one of multiple stations. In some embodiments, step 504 includes matching a basic service set color information with a color of beacons received on the transmission channel and comparing a signal-to-noise ratio of a beacon with a signal-to-noise ratio of the packet to obtain a basic service set identification of the dedicated radio. In some embodiments, step 504 includes receiving, from a central unit, an instruction for programming the association identifiers in a hardware register of the dedicated radio. In some embodiments, each of the dedicated radios has a different clock, and step 504 includes selecting a same clock for the time-stamp over a period of time.

Step 506 include providing multiple packets collected from the dedicated radios to the server. In some embodiments, step 506 may include providing at least some of the multiple packets collected to the database, for storage and statistical analysis.

Step 508 includes merging the packets from the dedicated radios to identify at least one station. In some embodiments, step 508 includes concatenating multiple data portions based on the time-stamp to form a data stream for the at least one station. In some embodiments, step 508 includes selecting packets having a same preamble for multiple transmit opportunities captured by each dedicated radio. In some embodiments, step 508 includes validating the station within a wireless network comprising the dedicated radios. In some embodiments, step 508 includes identifying a network malfunction based on the data portion and an identity of the station. In some embodiments, step 508 includes deriving a media access control address of the at least one station to identify the at least one station.

Figure 6:
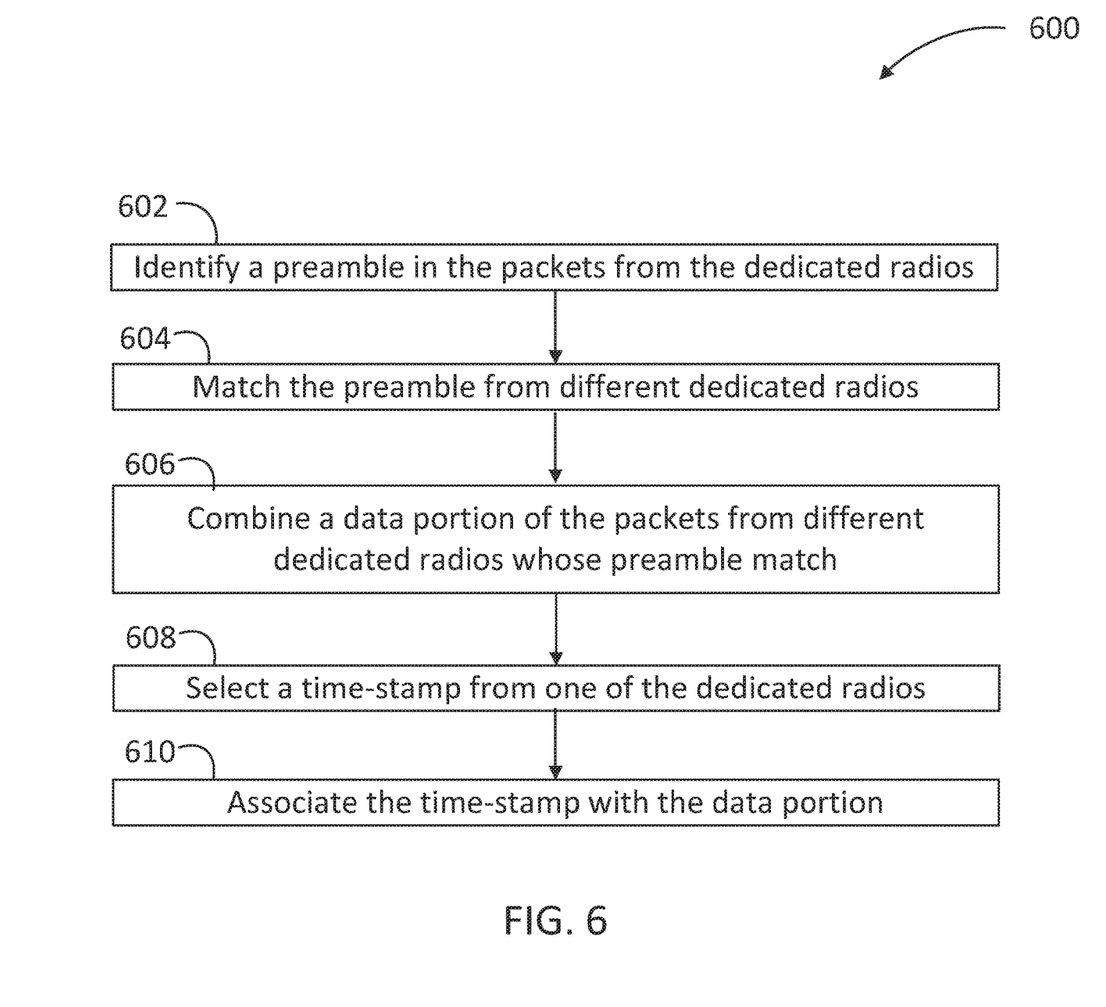
FIG. 6 is a flow chart illustrating steps in a method for capturing downlink (DL) and UL packets in a WLAN deployment, according to some embodiments.

FIG. 6 is a flow chart illustrating steps in a method 600 for capturing downlink (DL) and UL packets in a WLAN deployment, according to some embodiments. Method 600 may be performed at least partially by any one of a controller, or a network device while communicating with a station (e.g., any one of controllers 160 and 260, network devices 100 and 200, and stations 110 and 210). The station may be handled by a user, and the user may be a client of a wireless local area network (e.g., network 150, WLANs 10 and 20). The controller may be hosting a network analysis tool (e.g., network analysis tool 242). The network device and the station may host an OFDMA tool and a WIDS tool installed in the network device, and an application installed in the station (e.g., OFDMA tool 244-1, MU-MIMO tool 244-2, WIDS tool 246, and application 222). The controller may access traffic data from the network device, and use the OFDMA tool or the MU-MIMO tool to access the WLAN and identify an unauthorized, unwanted, or malicious intrusion into the WLAN. At least some of the steps in method 600 may be performed by a computer having a processor executing commands stored in a memory of the computer (e.g., any one of processors 212 and memory circuits 220). Further, steps as disclosed in method 600 may include retrieving, editing, and/or storing files in a database that is part of, or is communicably coupled to, the controller (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

In some embodiments, method 600 may be performed in the context of step 508 of method. 500. Accordingly, in some embodiments method 600 may be performed as a set of steps for merging packets from one or more dedicated radios to identify at least one station (cf. step 508 in method 500).

Step 602 includes identifying a preamble in the packets from the dedicated radios. In some embodiments, step 602 includes capturing a trigger frame from an access point to decode an uplink multi-user data transmission. In some embodiments, step 602 includes decoding a downlink multi-user data transmission. In some embodiments, step 602 includes decoding the data portion when the packets are part of a single-user spatially oriented signal.

Step 604 includes matching the preamble from different dedicated radios. In some embodiments, step 604 may include comparing a common subfield in the HE-SIG-B portion of a packet (cf. packet 300)

Step 606 includes combining a data portion of the packets from different dedicated radios whose preamble match. In some embodiments, step 606 includes concatenating the different data portions from each of the packets whose preamble match.

Step 608 includes selecting a time-stamp from one of the dedicated radios. In some embodiments, the dedicated radios may reside in different sniffer APs, having separate clocks.

Step 610 includes associating the time-stamp with the data portion. Accordingly, step 610 may include associating the clock in a first sniffer AP with a data portion including data captured from a second sniffer AP.

Hardware Overview

Figure 7:
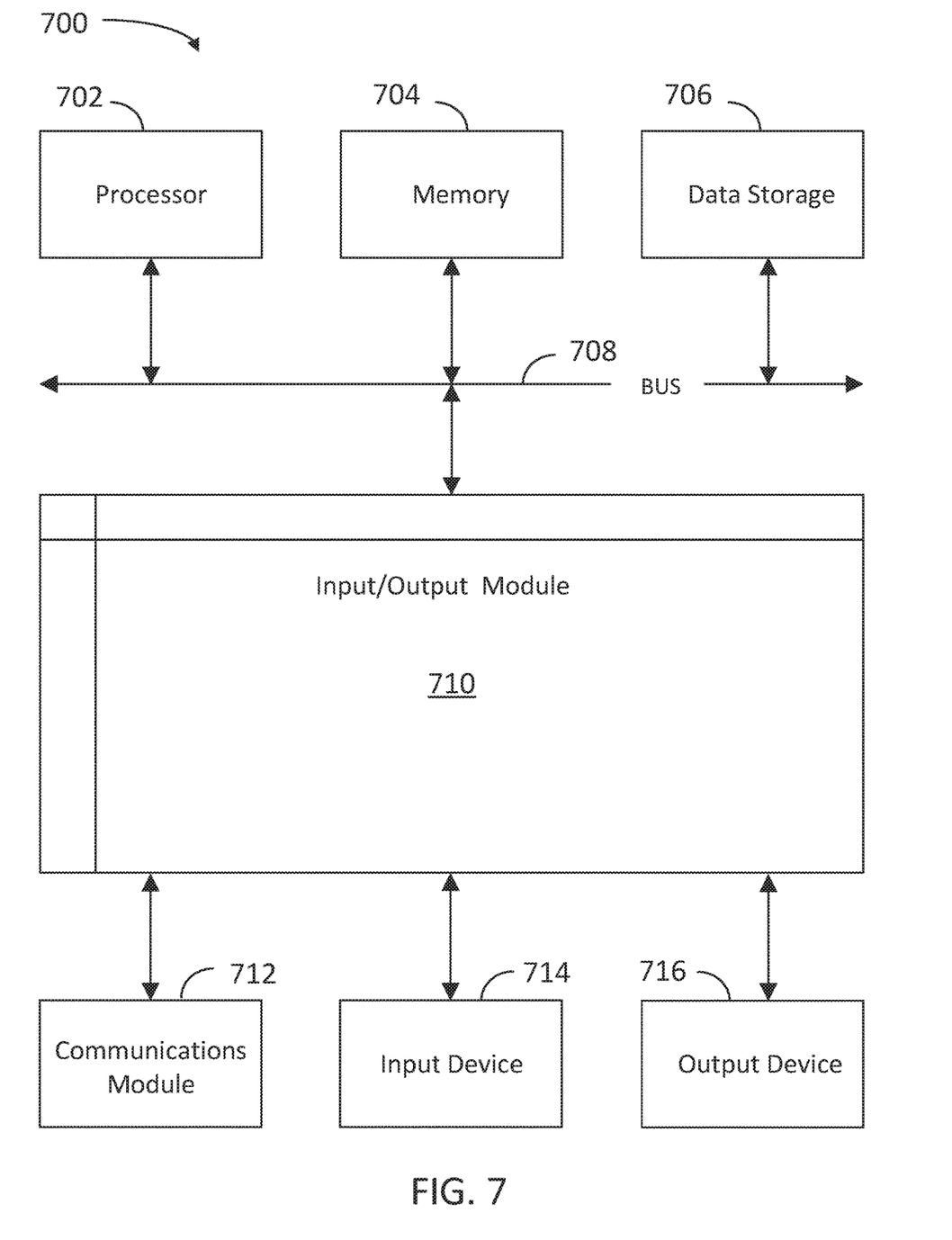
FIG. 7 is a block diagram illustrating an example computer system with which the client and network device of FIG. 1 and the methods of FIGS. 5-6 can be implemented.

FIG. 7 is a block diagram illustrating an example computer system 700 with which the WLANs 10 and 20, including APs 100, controllers 160 and 260, and network devices 200 of FIG. 1 and the method of FIGS. 5 and 6 can be implemented. In certain aspects, the computer system 700 may be implemented using hardware or a combination of software and hardware, either in a dedicated network device, or integrated into another entity, or distributed across multiple entities.

Computer system 700 includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, e.g., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB hubs, PCI hubs, etc. The input/output module 710 is configured to connect to a communications module 712. Exemplary communications modules 712 include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, APs 100, network devices 200, and controllers 160 and 260 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data network device, or that includes a middleware component, e.g., an application network device, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and network devices. A client and network device are generally remote from each other and typically interact through a communication network. The relationship of client and network device arises by virtue of computer programs running on the respective computers and having a client-network device relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   selecting multiple dedicated radios on a transmission channel;
   programing multiple association identifiers on each dedicated radio, wherein each of the association identifiers is configured to detect a resource unit assigned to one of multiple stations;
   providing multiple packets collected from the dedicated radios to a server; and
   merging the packets from the dedicated radios to identify at least one station.

2. The computer-implemented method of claim 1, further comprising receiving, from a central unit, an instruction for programming the association identifiers in a hardware register of the dedicated radio.

3. The computer-implemented method of claim 1, wherein each of the dedicated radios has a different clock, and further comprising selecting a same clock for a time-stamp over a period of time.

4. The computer-implemented method of claim 1, further comprising selecting packets having a same preamble for multiple single transmit opportunities captured by each dedicated radio.

5. The computer-implemented method of claim 1, further comprising validating the at least one station within a wireless network comprising the dedicated radios.

6. The computer-implemented method of claim 1, further comprising identifying a network malfunction based on a data portion of one or more packets and an identity of the station.

7. The computer-implemented method of claim 1, wherein the multiple dedicated radios comprise multiple baseband decoders in an access point of a wireless network, further comprising tuning the baseband decoders over multiple tones in a frequency channel to detect the resource unit assigned to one of multiple stations.

8. The computer-implemented method of claim 1, further comprising selecting a subset of dedicated radios from a set of radios in the radio vicinity of the transmission best suited for packet reception and collection based on neighborhood information.

9. The computer-implemented method of claim 1, further comprising decoding a downlink multi-user data transmission.

10. The computer-implemented method of claim 1, wherein identifying the at least one station comprises determining a resource unit map for the stations and a modulation coding scheme information for the stations.

11. The computer-implemented method of claim 1, further comprising matching a basic service set color information with a color of beacons received on the transmission channel and comparing a signal-to-noise ratio of a beacon with a signal-to-noise ratio of the packet to obtain a basic service set identification of the dedicated radio.

12. The computer-implemented method of claim 1, further comprising deriving a media access control address of the at least one station to identify the at least one station, and wherein identifying a preamble comprises decoding, from the preamble, at least one of a modulation and coding scheme, a bandwidth, and a guard interval of the transmission channel.

13. A system, comprising:
a memory circuit storing instructions; and
one or more processors configured to execute the instructions to:
  select multiple dedicated radios on a transmission channel;
  program multiple association identifiers on each dedicated radio, wherein each of the association identifiers is configured to detect a resource unit assigned to one of multiple stations;
  provide multiple packets collected from the dedicated radios to a server;
  program the association identifiers in a hardware register of the dedicated radio; and
  merge the packets from the dedicated radios to identify at least one station.

14. The system of claim 13, wherein each of the dedicated radios has a different clock, and the one or more processors further execute instructions to select a same clock for a time-stamp over a period of time.

15. The system of claim 13, wherein the one or more processors further execute instructions to select packets having a same preamble for multiple single transmit opportunities captured by each dedicated radio.

16. A non-transitory, computer-readable medium storing instructions which, when executed by a processor, cause a computer to perform a method, the method comprising:
selecting multiple dedicated radios on a transmission channel;
programing multiple association identifiers on each dedicated radio, wherein each of the association identifiers is configured to detect a resource unit assigned to one of multiple stations;
providing multiple packets collected from the dedicated radios to a server;
programming the association identifiers in a hardware register of the dedicated radio;
merging the packets from the dedicated radios to identify at least one station.

17. The non-transitory, computer-readable medium of claim 16, wherein the multiple dedicated radios comprise multiple baseband decoders in an access point of a wireless network, the method further comprising tuning the baseband decoders over multiple tones in a frequency channel to detect the resource unit assigned to one of multiple stations.

* * * * *